Oct. 30, 1951 W. P. MASON ET AL 2,573,168
MECHANICAL IMPEDANCE TRANSFORMER
Filed May 23, 1950

INVENTORS W. P. MASON
R. F. WICK
BY
ATTORNEY

Patented Oct. 30, 1951

2,573,168

UNITED STATES PATENT OFFICE 2,573,168

MECHANICAL IMPEDANCE TRANSFORMER

Warren P. Mason, West Orange, and Ronald F. Wick, Morristown, N. J., assignors to Bell Telephone Laboratories, Incorporated, New York, N. Y., a corporation of New York Application May 23, 1950, Serial No. 163,682

3 Claims. (Cl. 171—330)

This invention relates to means for producing and mechanically amplifying the magnitude of a linear repetitive displacement.

An object of the invention is a resonant electrostrictive transducer capable of longitudinal vibration to produce linear repetitive displacements of the ends of the transducer.

Another object of the invention is a resonant mechanical impedance transformer which will amplify the magnitude of the linear repetitive displacements.

A feature of the invention is a tapered resonant mechanical element linearly distorted along its longitudinal axis by a vibratory motor mechanism.

Another feature of the invention is an exponentially tapered resonant mechanical element linearly distorted along its longitudinal axis by a vibratory motor mechanism.

A further feature of the invention is a cylindrical resonant electrostrictive transducer polarized to vibrate along the axis of the cylinder, which may be composed of barium titanate polarized in the longitudinal mode.

The invention will be better understood from the following description, read in connection with the drawings, in which:

Fig. 1 discloses a typical embodiment of the invention, arranged to produce forces tangential to the surface of a material, which will result in shearing and abrasive effects;

Figure 1:
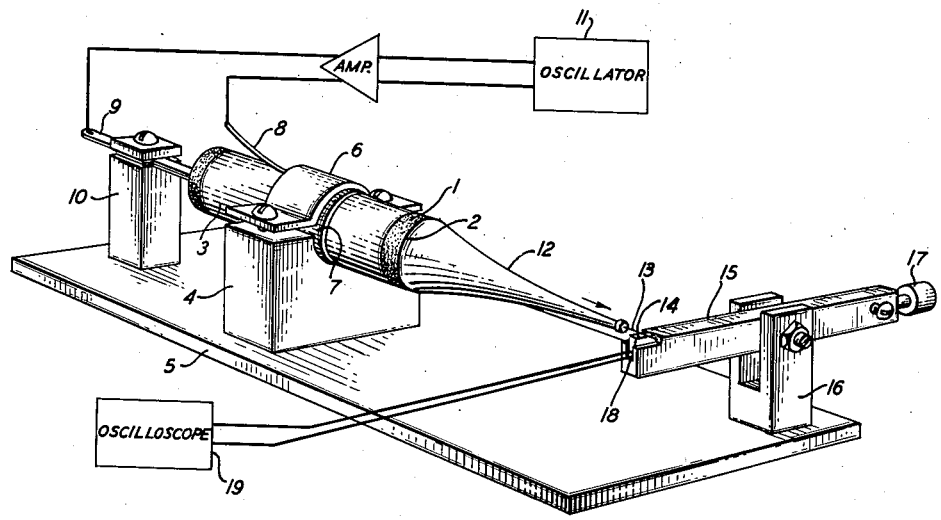
Figure 2:
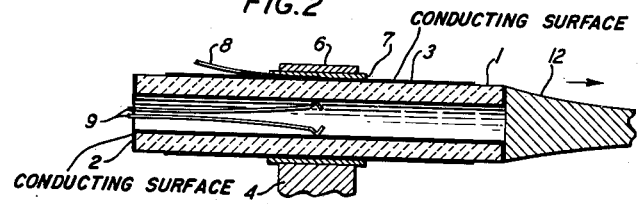
Fig. 2 is a detail in partial cross-section, showing the connection to the motor element of Fig. 1.
Figure 4:
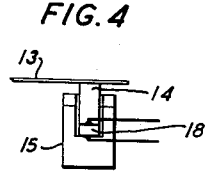
Fig. 4 is an end view of the detecting means disclosed in Fig. 1.
Figure 3:
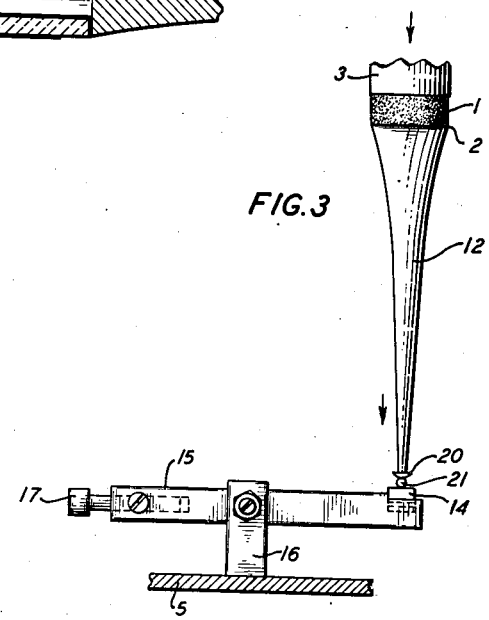
Fig. 3 is an embodiment of the invention, arranged to produce forces normal to the surface of a material, resulting in impulsive or hammering effects.

The motor element 1, in Figs. 1, 2 and 3, is a hollow cylinder of barium titanate, with 4 per cent lead titanate, radially polarized with a voltage of 7500 volts at a temperature of 130° C. and cooled with this polarizing field applied. This procedure polarizes the lead titanate mixture in a radial direction, so that an alternating field then causes an expansion of the cylinder in the direction of its length, and a radial contraction. For a frequency of vibration of 18,000 repetitions per second, this cylinder may conveniently be 4¾ inches long, 1 inch outside diameter, and ½ inch inside diameter. The inner surface of the cylinder 1, is plated, or otherwise covered, with a conducting layer 2, which may extend over the end of the cylinder. The external surface of the cylinder 1 is plated, or otherwise covered, with a conducting layer 3, which is short enough to leave a portion of the cylinder 1 uncovered, so as to insulate the two coverings 2 and 3 from each other. The conducting layers 2 and 3, may conveniently be made of some metal having good electrical conductivity, such as copper, silver, gold, etc.

The motor element 1 will have a nodal point approximately in the center of the cylinder, and, for the production of tangential forces, may conveniently be supported by a standard 4, Fig. 1, supported on a convenient base 5, and may be secured to the standard 4 as by a clamp 6. A layer of resilient material 7, such as a thin piece of felt, may conveniently be interposed between the cylinder and the clamp 6. A flexible contact 8 may be placed between the layer 7, in contact with the conducting layer 3, and secured by the clamp 6. A bifurcated spring terminal 9, which makes contact with the conducting layer 2 at the nodal point of the cylinder 1, is insulatingly supported by the standard 10 attached to the base 5. An oscillator 11, or other source of alternating voltages, suitably amplified if desired, is connected to the terminals 8 and 9, to cause the cylinder 1 to vibrate longitudinally at the frequency of the alternating voltages.

While a barium titanate cylinder has been disclosed as the most convenient and efficient driving element, other motor elements, such as crystal, magnetostrictive, or mechanical element, may be used so long as the motion of the motor element is linear. While a hollow cylindrical drive element is considered to be one of the most efficient forms, other forms may be used, such as a hollow rod, with 4, 6, 8, etc. sides.

A mechanical amplifier 12 is secured to the end of the cylinder 1 in any suitable manner, such as by soldering to the conducting layer 2 on the ends of the cylinder 1. While it is not essential that the large end of the mechanical amplifier should have the same area as the drive element 1, this condition will give the most efficient transfer of power. In order to resonate with the repetition rate of the motor element 1, the mechanical amplifier 12 must have a length which is an integral number of half wavelengths of the wave of the repetition frequency in the material of the horn. To secure a large amplification of movement, the mechanical amplifier 12 should be made of a substance which can expand by a large ratio before exceeding its elastic limit, thus, the mechanical amplifier 12 preferably should be made of metal, such as brass, while plastic materials, such as hard rubber, are in general rather inefficient. For the most efficient operation, the mechanical amplifier 12 preferably has an exponential taper, though, as this is a single frequency device, a conical horn can be used with little loss of efficiency or an element in the shape of a number of cones in multiple steps to approximate the outline of an exponential curve. An element which has abrupt discontinuity, such as a stepped cylinder, will lose efficiency due to the reflections of power at the impedance irregularities. The mechanical amplifier 12 preferably has a circular cross-section, and in this case the motion applied to the large end of the mechanical amplifier 12 will be amplified in the inverse ratio of the diameters of the ends. In a typical embodiment of the invention, the mechanical amplifier 12 was a solid brass horn having a 1-inch diameter at the large end which decreased with an exponential taper down to a diameter of 0.1 inch at the free end, and a length of 4⅝ inches, corresponding to a half wavelength of the 18-kilocycle frequency in the brass. The barium titanate cylinder 1 has a maximum motion of about 0.2 mil inch at the two ends, which is amplified by the brass horn 12 in the inverse ratio of the diameters of the ends to a motion of 2.0 mil inches, with a ten-to-one decrease in the force that can be exerted by the device. By tapping the end of the brass horn 12 with an inside or outside thread, various tools can be attached to the unit and they will vibrate with the particle velocity of the small end of the horn 12.

In some modern relays, such as the relay disclosed in United States Patent 1,647,792, November 1, 1927, E. W. Gent, the contact springs are in the form of wires which are actuated by an insulating plate or card. As the effective life of such a relay will depend upon the wear produced in the card by the action of the wire, it is desirable to have a method of testing the material of the card for its resistance to wear caused by the action of the wire. In Fig. 1 a wire 13, of the type used in such relays, is suitably attached to the free end of the horn 12 and presses against a small piece 14 of the material of the card. The piece of material 14 is glued, or otherwise attached, to a bar 15, pivotally supported in a standard 16, mounted on the base 5. A counterweight 17 mounted on the outer end of the bar 15, may be adjusted to vary the pressure exerted by the wire 13 on the material 14. A small piece of suitably polarized barium titanate 18 may be mounted under the piece of material 14 and connected to an oscilloscope 19, to indicate the forces exerted on the material. Due to the linear repetitive displacements of the free ends of the horn 12, the wire 13 is drawn back and forth across the surface of the material 14, the forces exerted are indicated on the oscilloscope 19, and by examination or test the wear produced in the material may be determined. For small forces and displacements, the reaction of the material is elastic, and no slide occurs between the wire 13 and the material 14. When the tangential force exceeds the product of the normal force multiplied by the coefficient of friction between the wire and the material, the wire will slide on the material and will wear the material.

To test the material for its resistance to the forces normal to the surface of the material, the cylinder 1 may be supported in a vertical position by any suitable means, not shown, such as the supports and clamps commonly used in chemical laboratories. In order to ensure that the forces are exerted normal to the surface of the material, an element 20 having a slight concavity in the head, is affixed to the free end of the horn 12, and a small metallic ball 21 is interposed between the element 20 and the surface of the material 14. The forces exerted may be measured and observed in the same manner as shown in Fig. 1. In addition to testing a sample of material for its resistance to tangential and normal forces, the present device is adapted for many other uses. For example, the wire 13 may be shaped or ground so that when pressed against a coated surface, the device will measure the adhesion of a film, such as paint or varnish, to the surface of a material. Also, the adhesion of a film to the surface of a solid material such as a metal can be measured by coating of the flat end surface of a fixture secured to the small end of the horn and noting the amplitude of motion at which the force of inertia breaks the film loose. By attaching a grinding tool to the horn 12, and using an abrasive material, the device can be used as a drill for odd shaped holes, or as a grinding device. This device also could be made larger, and could then deliver blows up to 100 pounds, or so, with great frequency. In this form it may be used as a riveting hammer, having a very rapid repetitive rate, and for metallurgical operations. When vibrating at a frequency of 18 kilocycles per second, this device will perform 1,000,000 operations per minute, and thus may be used for accelerated tests of fatigue in metals, and for accelerated tests of vibrating devices, such as electrical relays.

The cylinder 1 exerts a comparatively large force, and vibrates at a comparatively low velocity, thus forming a high mechanical impedance. The free end of the horn 12, exerts a comparatively small force, and vibrates at a comparatively high velocity, thus presenting a comparatively low mechanical impedance. In other words, the horn 12 is the mechanical impedance transformer, transforming the high impedance of the cylinder 1 into the low impedance of the free end of the horn 12. This action is, of course, reversible, thus a low impedance driving source may be attached to the small end of the horn 12 and this low impedance will be transformed into a high impedance source as viewed from the larger end of the horn 12.

What is claimed is:

1. In a vibratory mechanism, a driver element linearly vibrating at constant rate, a driven element having a mechanical impedance differing from the mechanical impedance of said driver element, and a mechanical impedance transformer connecting said driver and driven elements, said transformer comprising a tapered metallic element resonant to said rate, the ratio of the areas of the cross-sections of the ends of said metallic element at the driver and driven elements being in inverse ratio to the impedances of said driver and driven elements.

2. In a vibratory mechanism, a driver element linearly vibrating at constant rate, a driven element having a mechanical impedance differing from the mechanical impedance of said driver element, and a mechanical impedance transformer connecting said driver and driven elements, said transformer comprising a conical metallic element resonant to said rate, the ratio of the areas of the cross-sections of the ends of said conical element at the driver and driven elements being in inverse ratio to the impedances of said driver and driven elements.

3. In a vibratory mechanism, a driver element linearly vibrating at constant rate, a driven element having a mechanical impedance differing from the mechanical impedance of said driver element, and a mechanical impedance transformer connecting said driver and driven elements, said transformer comprising an exponentially tapered metallic element resonant to said rate, the ratio of the areas of the cross-sections of the ends of said metallic element at the driver and driven elements being in inverse ratio to the impedances of said driver and driven elements.

WARREN P. MASON.
RONALD F. WICK.

REFERENCES CITED

The following references are of record in the file of this patent:

UNITED STATES PATENTS

| Number | Name | Date |
| --- | --- | --- |
| 1,380,869 | Fay | June 7, 1921 |
| 2,486,560 | Gray | Nov. 1, 1949 |
| 2,514,080 | Mason | July 4, 1950 |